No. 807,585. PATENTED DEC. 19, 1905.
E. H. STEEDMAN.
VALVE FOR AIR COMPRESSORS.
APPLICATION FILED NOV. 2, 1903.
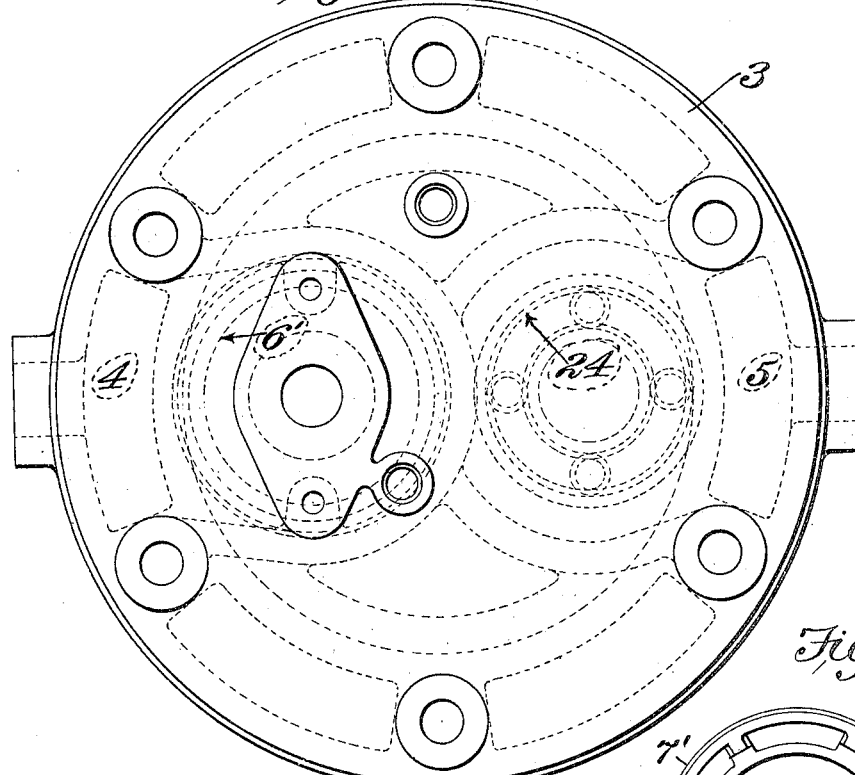
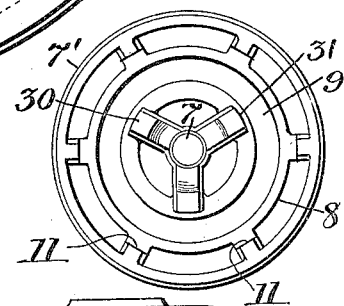
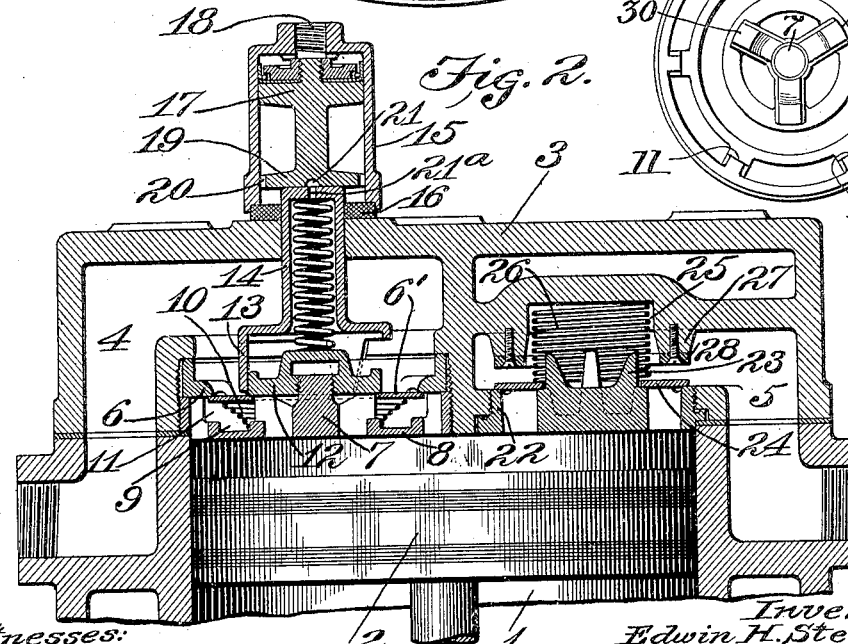

UNITED STATES PATENT OFFICE.

EDWIN H. STEEDMAN, OF ST. LOUIS, MISSOURI.

VALVE FOR AIR-COMPRESSORS.

No. 807,585.　　　　Specification of Letters Patent.　　　　Patented Dec. 19, 1905.

Application filed November 2, 1903. Serial No. 179,596.

*To all whom it may concern:*

Be it known that I, EDWIN H. STEEDMAN, a citizen of the United States, residing at the city of St. Louis, State of Missouri, have invented a certain new and useful Improvement in Valves for Air-Compressors, of which the following is a full, clear, and exact description, such as will enable others skilled in the art to which it appertains to make and use the same, reference being had to the accompanying drawings, forming part of this specification, in which—

Figure 1 is a plan view of the cylinder-head in which my improved valves are arranged, and Fig. 2 is a sectional view through said head. Fig. 3 is a top plan view of the part which acts as a valve-guide.

This invention relates to a new and useful improvement in valves for air-compressors, the object being to utilize a thin sheet-metal valve of flat disk form which is quick-acting and cheap, said valve being also light and sensitive, so that in operation it contributes materially to the high efficiency of the compressor.

The objects of the present invention are to utilize this type of valve both on the suction and discharge sides of the pump, the associate parts being so constructed that the valve is ported for the passage of air around the inner and outer edges thereof.

With these objects in view the invention consists in the construction, arrangement, and combination of the several parts, all as will be hereinafter described and afterward pointed out in the claims.

In the drawings, 1 indicates the cylinder, 2 the piston, and 3 the removable cylinder-head, which head is formed hollow, the suction-chamber 4 communicating with an opening in the cylinder and the discharge-chamber 5 also communicating with an opening in the cylinder, pipe connections being made with the cylinder in preference to the head, thus enabling the head to be removed without disconnecting the pipes. A valve-casing is provided, which is illustrated as comprising two sections.

6 indicates the seat for the suction-valve, constituting one section of the valve-casing, which seat is preferably of skeleton form, with its under surface finished to receive the flat disk valve 6'. The central or hub portion of this seat is recessed and threaded to take in a threaded stem 7 on the remaining part 7' of the valve-casing, which part 7' is of slightly larger diameter than the part or section 6 and threaded into the inner wall of the cylinder-head. This separate part 7' of the valve-casing is of spider or skeleton form and includes in its construction a concentric ring 8, whose upper surface is provided with an annular groove 9 for receiving the conical helical spring 10, which holds the valve 6' to its seat. The radial arms extending from the hub or post 7 are recessed at 11 on their upper faces to accommodate the movement of the valve 6' and also guide said valve in its movement. The construction above described is such that when said valve is opened by incoming air the spring 10 is compressed in its receiving-groove 9, and the valve 6' is supported on the ring 8, leaving openings for the air to pass around the inner and outer edges of said ring 8.

The central hub portion of the valve-seat 6, before referred to, which is indicated as 12 in the drawings, forms a guide for the prongs 13 of a displacing-thimble 14, which is preferably formed hollow and extends through the outer wall of the cylinder-head, by which it is also guided in its movement.

15 indicates a governing-cylinder secured in position on the cylinder-head, a fiber washer 16 being preferably interposed between the cylinder 15 and the cylinder-head, said fiber washer being a non-heat conductor, preventing the heat from the cylinder-head reaching the cylinder 15.

A piston 17 is arranged in the cylinder 15, and a pipe is fitted in the connection 18, so as to conduct air from the reservoir or discharge side of the compressor to a point above the piston, a suitable regulating-valve controlling the admission of such air, (not shown in the drawings,) whereby when the air in the discharge side of the compressor reaches or exceeds a predetermined maximum it will force the piston 17 down, and with it the thimble 14, whose arms 13 displace the suction-valve, enabling the compressor to draw in and force out the air through the suction-openings. The lower end of piston 17 is provided with a guiding-head 19, having openings 20 in its periphery and a cross-groove 21 to take care of leakage, which leakage escapes through an opening 21ᵃ in the upper end of the thimble 14.

It will be noticed with respect to the suction-valve that the one part of the casing is supported by a central stem and also at its edges, so that said part acts as a cage to prevent any parts that might be broken from falling into the cylinder. The manner in which the cage itself is supported at its center and edges prevents the cage from falling into the cylinder, even though the same may be broken in service.

The discharge-valve consists of a seat 22, in the center of which rise guiding-lugs 23, the upper face of said seat receiving and supporting the disk valve 24 at its center and marginal edges. A recess 25 is provided in the cylinder-head for the reception of a spring 26, whose function is to hold the valve 24 to its seat. Around this recess are arranged posts 27 for supporting a ring 28, secured in position by suitable screws entering the post, said ring acting as a limiting-stop and support for the valve 24 when said valve is raised off its seat. This support prevents the marginal edges of the valve from sagging, as it will be noticed that the spring 26 bears near the inner edge of the valve. This discharge-valve when raised off its seat and supported by the ring 28 permits the air to pass around the outer edge into the discharge-chamber 5 and also around the inner edge and around the guiding-lugs 23 and through the spaces between spring 26 and posts 27 into the chamber 5.

By reference to Fig. 2 it will be observed that the valve 6' is guided between the edges of the radial webs or arms 30 and the upstanding lugs 31 at its inner and outer edges, respectively. With the energy of the spring exerting itself thereagainst any liability of the valve becoming unseated will be avoided. It is of course desirable that the energy of the spring be exerted on the parts uniformly over the under surface of the valve, so that it will uniformly bear against its seat when acting as a cut-off, and thereby close the port, which would otherwise be open. It will also be observed that one part of the valve-casing supports the other—that is to say, the part 7' is threaded into the recess in the cylinder-head supporting the complementary part, the complementary part comprising the seat for the valve. This complementary part in turn is secured to the threaded part through the medium of the stem or threaded lug 7, so as to centrally support the complementary part.

I am aware that minor changes in the construction, arrangement, and combination of the several parts of my device can be made and substituted for those herein shown and described without in the least departing from the nature and principle of my invention.

Having thus described my invention, what I claim, and desire to secure by Letters Patent, is—

1. In a suction-valve mechanism for air-compressors, the combination with a flat annular valve formed from thin sheet material, of a valve-casing consisting of two parts, one having a seat for the valve, and being of skeleton form, and the other having a plurality of guides for supporting the valve at its inner and outer marginal edges in its open position, and a valve-holding spring interposed between the valve and the supporting part; substantially as described.

2. In a suction-valve mechanism for air-compressors, the combination with a flat annular valve formed from thin sheet material, of a valve-casing consisting of two parts, one having a seat for the valve and being of skeleton form, and the other forming a support and guiding means for the inner and outer edges of the valve in its open position, and means for holding said two parts of the valve-casing together, the part which is of skeleton form being supported at its outer edge by the other part when said parts are in operative position; substantially as described.

3. In a suction-valve mechanism for air-compressors, the combination of a valve, a valve-casing consisting of two parts, one having a seat for the valve and being of skeleton form, and the other forming a cage for supporting the valve in its open position at its inner and outer edges, said cage part of the valve-casing having a threaded periphery for engagement with the cylinder-head, means for guiding the valve, and a valve-holding spring interposed between the valve and the cage; substantially as described.

4. In a suction-valve mechanism for air-compressors, the combination with a valve, of a valve-casing consisting of two parts, one having a seat for the valve and being of skeleton form, and the other serving as a support for the valve in its open position, said last-mentioned part being of slightly greater diameter than the seat portion for engagement with the cylinder-head, and a cylinder-head formed with a flanged opening against which the seat portion of the valve-casing is clamped; substantially as described.

5. In a suction-valve mechanism for air-compressors, the combination with a cylinder-head having a threaded opening provided with an inturned flange at one end, a valve-casing consisting of two parts, one having a seat for the valve and being of skeleton form, said seat portion resting against the flange in the opening, and the other portion of the valve-casing being connected to said seat portion at its center and being of slightly larger diameter than said seat portion and threaded into said opening so as to form a support for the valve in its open position and also act as a cage; substantially as described.

6. In a discharge-valve for air-compressors, the combination with a valve-seat, of a valve coöperating therewith, upstanding lugs carried by the valve-seat, a spring for holding said valve to its seat, and means having a surface for supporting the valve in its open position and provided with openings above the supporting-surface in communication with discharge-passages; substantially as described.

7. In a discharge-valve for air-compressors, the combination with a seat-valve, of a flat disk valve coöperating therewith, spaced guiding-lugs for guiding said valve in its movement, a spring for holding said valve to its seat, and a cylinder-head having a recess for receiving said spring and provided with a surface for supporting the valve in its open position and having openings above the supporting-surface communicating with the discharge-passage; substantially as described.

8. In a suction-valve for air-compressors, the combination with a valve-seat having a hub portion, an annular boss on said hub portion forming an inner part to the valve-seat, a flat disk valve coöperating with said seat, a spring for holding said valve to its seat, and a housing-support for said spring; substantially as described.

9. In a valve for air-compressors, the combination with a hollow cylinder-head, of a valve-seat secured in the inner wall of said cylinder-head, guiding-lugs arranged on said valve-seat, a flat disk valve supported at its center and marginal edges by said valve-seat and guided in its movement by said lugs, and a spring seated in a recess in the outer wall of the hollow cylinder-head, the end faces of the walls around said recess forming a support for the valve in its open position; substantially as described.

10. In a valve for air-compressors, the combination with a hollow cylinder-head, of a valve-seat in its inner wall, guiding-lugs arranged on said valve-seat, a flat disk valve supported at its center and marginal edges by said valve-seat and guided in its movement by said lugs, a recess in the outer wall of the cylinder-head, openings in the wall of said recess communicating with the discharge-chamber, the ends of said wall forming a limiting-stop for the valve, and a spring seated in said recess for holding said valve to its seat; substantially as described.

In testimony whereof I hereunto affix my signature, in the presence of two witnesses, this 26th day of October, 1903.

EDWIN H. STEEDMAN.

Witnesses:
 F. R. CORNWALL,
 GEORGE BAKEWELL.